July 20, 1926.
H. P. THIELE
CARPET BEATER
Filed March 3, 1925
1,593,479
2 Sheets-Sheet 1
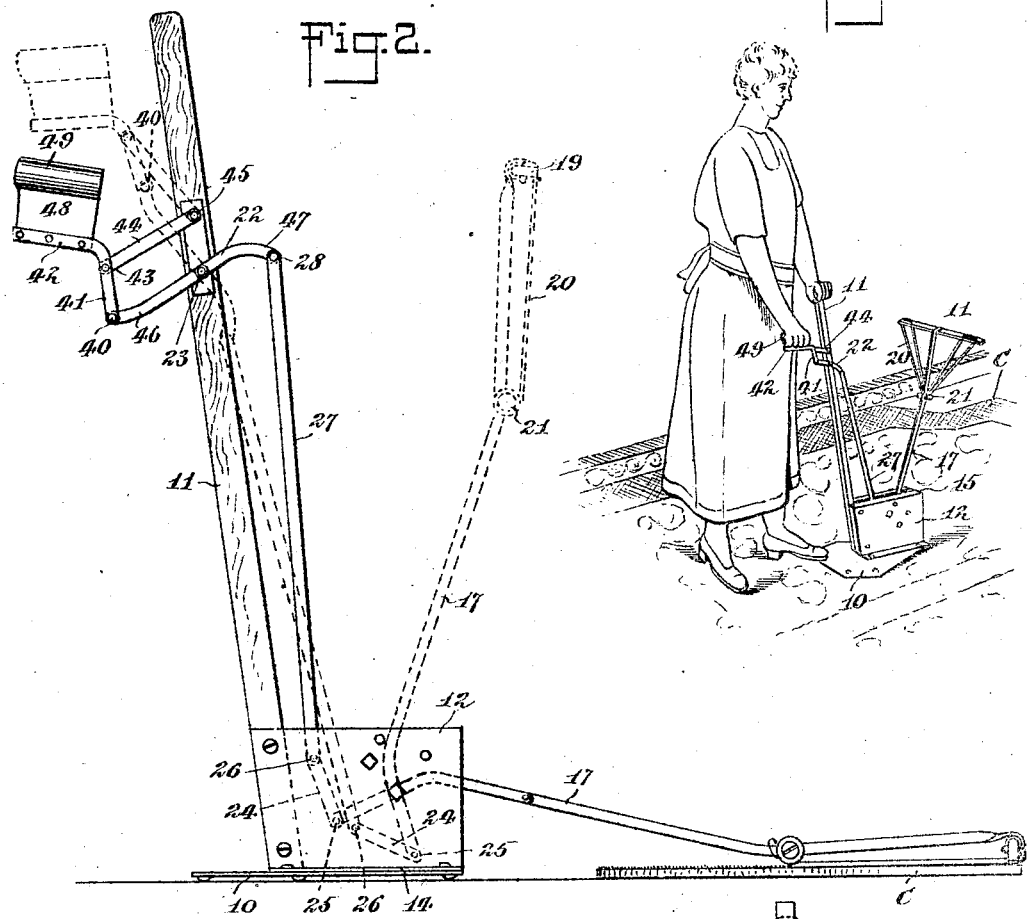
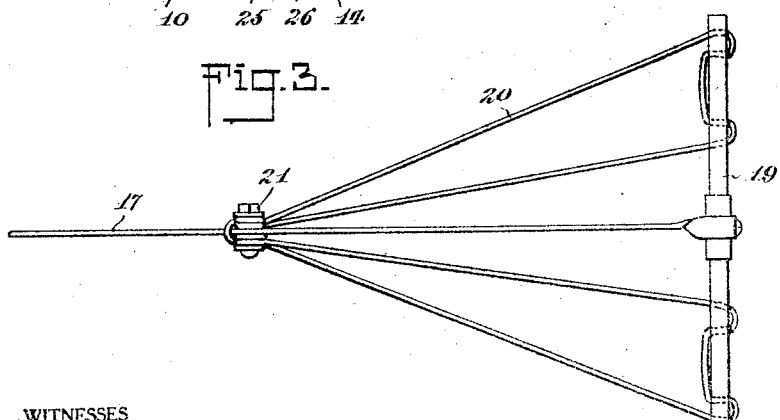
WITNESSES
William P. Goebel.
Hugh H. Ott.
INVENTOR
Henry P. Thiele
BY
ATTORNEYS July 20, 1926.
H. P. THIELE
CARPET BEATER
1,593,479
Filed March 3, 1925    2 Sheets-Sheet 2
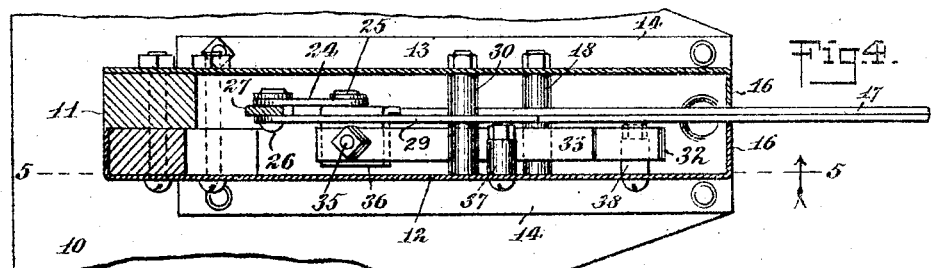
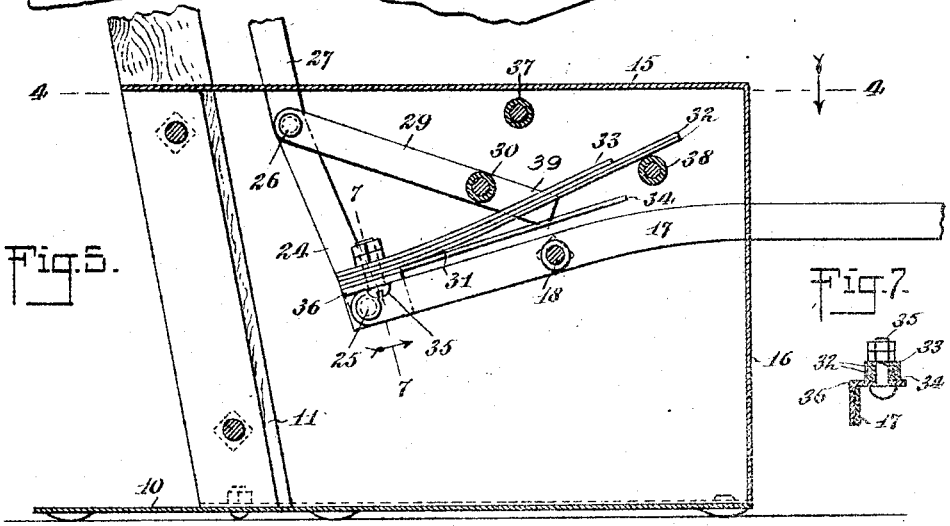
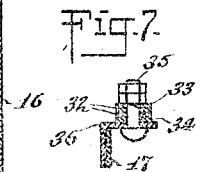
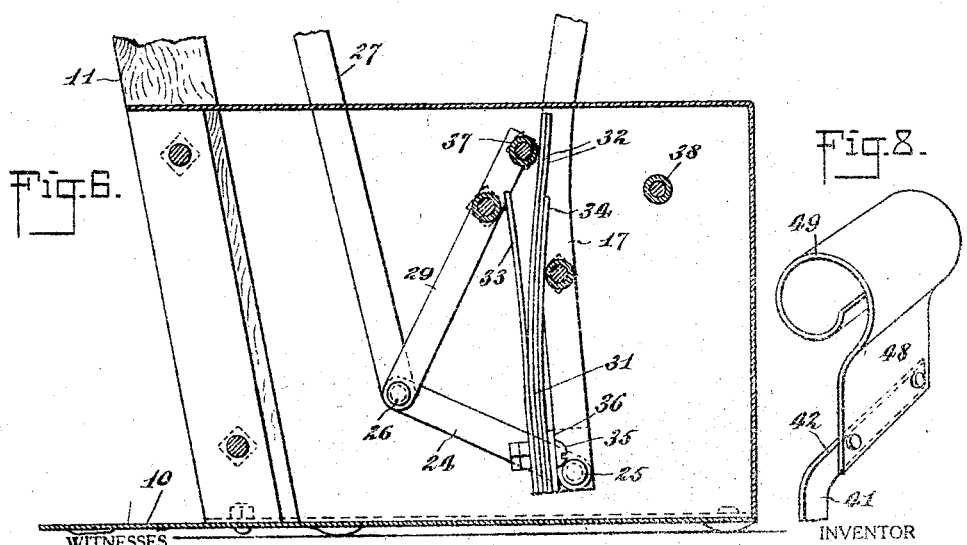
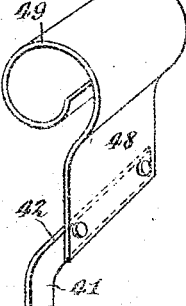
INVENTOR
Henry P. Thiele
BY
ATTORNEYS Patented July 20, 1926.

1,593,479

UNITED STATES PATENT OFFICE.

HENRY PHILIPP THIELE, OF NEWARK, NEW JERSEY.

CARPET BEATER.

Application filed March 3, 1925. Serial No. 12,932.

This invention relates to devices for beating carpets, rugs or other floor coverings and comprehends certain improvements in a carpet beater of the same general type as disclosed in my prior Patent No. 1,528,708, March 3, 1925.

One of the principal objects of the present invention resides in the provision of a carpet beater provided with an improved system of levers for imparting a maximum force to the blow of the beater element with the carpet with a minimum of power exerted by the operator.

Another object in view is to provide an improved means for arresting the movement of the beater element at the opposite ends of its stroke so as to relieve the device and the operator of unnecessary shocks and jars.

As a still further object the invention comprehends the provision of a novel form of hand grip or manipulating handle which insures proper operation of the machine without blistering or callousing the hand.

As a still further object the invention comprehends a novel form of locking means for holding the beater element in an inactive position when the device is not in use.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view illustrating the beater in use.

Fig. 2 is a side view thereof illustrating in broken lines the beater element locked in its inactive position.

Fig. 3 is a fragmentary plan view of the beater element.

Fig. 4 is a fragmentary sectional plan view taken approximately on the line 4—4 of Fig. 5.

Fig. 5 is a vertical fragmentary sectional view taken approximately on the line 5—5 of Fig. 4 and illustrating the beater element at the lowermost end of its down stroke.

Fig. 6 is a similar view illustrating the beater element at the uppermost limit of its up stroke.

Fig. 7 is a detail transverse sectional view taken approximately on the line 7—7 of Fig. 5.

Fig. 8 is a fragmentary perspective view of the manipulating hand grip.

Referring to the drawings by characters of reference the device includes a horizontal base 10 upon which is mounted an upstanding handle 11 preferably disposed at a rearward inclination. A pair of spaced parallel upstanding side walls 12 and 13 are also arranged on the base 10 and respectively disposed on opposite sides of the upstanding handle 11. The walls are provided at their lower ends with outturned side flanges 14 to constitute means for attaching the same to the base and are further provided with inturned upper edges 15 and forward edges 16 which are spaced apart to provide a slot. A beater arm 17 is pivoted on a transverse pivot bolt 18 mounted or anchored in the opposite side walls 12 and 13. The beater arm extends through and is movable in the slot between the inturned edges 15 and 16 of the walls 12 and 13. At its outer end the beater arm is provided with a transverse supporting bar 19 through which is threaded an endless length of resilient flexible material 20, preferably a rubber covered wire the ends of which are connected to a transverse bolt 21 in spaced relation to the cross bar 19 to provide a beater member. The means for actuating the beater arm to cause the same to be alternately raised and lowered whereby on its downward stroke it is forcibly brought into contact with the rug, carpet or other floor covering which is being operated upon comprises an actuating lever 22 pivoted as at 23 adjacent the upper end of the handle 11, a link 24 pivotally connected as at 25 to the inner end of the rock lever and pivotally connected as at 26 to a connecting rod 27 which is in turn pivotally connected as at 28 to the actuating lever 22. In order to further brace and guide the movement of the beater arm, the link and the connecting rod, a guide and brace arm 29 is employed which is pivoted on a transverse pivot shaft 30 mounted in the walls 12 and 13. The free end of the arm 29 is pivotally connected to the pivotal point of connection 26 between the link 24 and connecting rod 27. A buffer means is also provided for yieldably limiting the downward and upward movements of the beater arm so as to absorb the shocks and jars incident to the reversal of its direction of movement and said buffer element consists of a multiple leaf spring 31 which comprises intermediate leaves 32 and outer leaves 33 and 34 of lesser length than the intermediate leaves. The leaves of the multiple leaf spring are rigidly connected by a bolt 35 to an angle bracket 36 at the inner end of the beater arm and the projecting portion of the longer intermediate leaves coact respectively with spaced upper and lower stop studs 37 and 38 as clearly illustrated in Figs. 5 and 6. On the down stroke the outer leaf 33 backs up the intermediate leaves 32 when contacting with the stop 38 to set up an auxiliary tension whereas on the up stroke the outer leaf 34 functions in the same capacity. The portion 39 of the guide and brace arm 29, which extends beyond the pivot 30 serves as a guide to prevent lateral displacement of the multiple leaf spring 31 and holds the leaves thereof in alinement.

The actuating lever 22 has pivotally connected as at 40 to its free outer end the angular terminal 41 of a handle bar 42 and said terminal 41 has pivotally connected thereto as at 43 a link 44 which is pivotally connected as at 45 to the handle 11. The opposite arms of the lever 22 are offset in opposite directions as indicated at 46 and 47. The handle bar 42 carries a hand grip 48 which consists of a strip of material rolled at its free upper end as at 49 in a spiral arrangement to afford a comfortable grip portion adapted to be grasped between the fingers and the heel of the hand. The opposite offset portions 46 and 47 of the lever arms 22 affords an arrangement whereby the beater arm and beater may be locked in an upstanding position when not in use. This is accomplished by virtue of the fact that the pivotal point 40 is swung to a position past the alinement of the pivotal points 43 and 23 so that the tension of the multiple leaf spring 31 combined with the weight of the beater and beater arm prevents casual unlocking of the past center arrangement except when the hand grip and handle bar are intentionally manipulated to break the past center locking position.

In use and operation of the device, the operator places the base on or adjacent the carpet, rug or other floor covering C, grasps the upper end of the handle 11 and if desired places the foot on the base to steady the device. The roller portion 49 of the hand grip 48 is then grasped by the four fingers and the heel of the hand so that an easy upward and downward movement of the hand grip effects a rocking action to the lever 22. Due to the connecting rod and link connection between the lever 22 and the inner end of the beater arm 17, the rocking movement of the lever 22 is imparted to the beater arm so that the same is swung alternately from an upward position to a downward position whereby upon the down stroke the beater is forcibly contacted with the carpet C. Due to the system of leverage, the power required to obtain a very forcible stroke is reduced to an absolute minimum and further due to the multiple leaf spring 31, the shocks and jars incident to the change of direction of movement of the beater arm are absorbed so that the change of direction is in effect initially started by virtue of the tension of the spring leaves of the buffer element. The construction of the beater is such as to preclude cutting or injuring of the floor coverings being operated upon and in event of breakage of the strands of material which constitute the beater elements, the same may be readily strung at a small cost. When the machine is not in use the operator manipulates the hand grip 48 to swing the lever 22, the link 44 and the handle bar 42 to its past center locking position so that the beater arm and beater are maintained in an upright position substantially as illustrated in dotted lines in Fig. 2.

From the foregoing it will thus be seen that a carpet beater has been devised which greatly facilitates the operation of beating and cleaning carpets or other floor coverings with a minimum of effort on part of the user.

I claim:

1. A carpet beater comprising a base, an upstanding handle on the base, a pair of spaced vertical walls extending longitudinally of the base, a beater element having an arm pivoted between said walls, means carried by the walls and operatively connected with said arm for actuating the same and means carried respectively by the beater arm and the walls for yieldably limiting the movement of the beater arm and for tensioning the same at the opposite ends of its stroke to assist in the change of direction of movement of said beater arm, said means comprising a multiple leaf spring and spaced stop studs disposed in the path of movement of the free end of the leaf spring for engagement therewith immediately prior to the beater arm reaching the limit of its movement, whereby said spring will be flexed between its point of connection with the beater arm and the respective stop studs.

2. A carpet beater comprising a base, an upstanding handle on the base, a pair of spaced vertical walls extending longitudinally of the base, a beater element having an arm pivoted between said walls, means carried by the walls and operatively connected with said arm for actuating the same and means carried respectively by the beater arm and the walls for yieldably limiting the movement of the beater arm and for tensioning the same at the opposite ends of its stroke to assist in the change of direction of movement of said beater arm, said means comprising a multiple leaf spring and spaced stop studs disposed in the path of movement of the free end of the leaf spring for engagement therewith immediately prior to the beater arm reaching the limit of its movement, whereby said spring will be flexed between its point of connection with the beater arm and the respective stop studs and a projecting portion from the actuating means disposed alongside of the multiple leaf spring for guiding the same and maintaining the leaves thereof against lateral displacement.

3. A carpet beater comprising a base, a rearwardly inclined upstanding handle on the base, a pair of spaced vertical walls extending longitudinally of the base, a beater element having an arm pivoted between the walls, an actuating rock lever pivoted to the handle adjacent its upper end, a link pivoted to the inner end of the beater arm, a connecting bar pivotally connected at its opposite ends to the link and rock lever, a bracing and guiding arm pivoted to the walls and having pivotal connection with the link and connecting bar at their point of connection with each other, and a multiple leaf spring rigidly connected to the inner end of the beater arm, said spring having intermediate and outer leaves, spaced studs carried by one of the walls with which the former leaves coact to yieldably limit the downward and upward movement of the beater and to constitute means for initially effecting the change of direction of movement of the beater arm.

HENRY PHILIPP THIELE.